US011108106B2

(12) United States Patent
Ardebili et al.

(10) Patent No.: US 11,108,106 B2
(45) Date of Patent: Aug. 31, 2021

(54) STRETCHABLE FABRIC BASED ELECTRODE-POLYMER ELECTROLYTE BATTERY

(71) Applicant: UNIVERSITY OF HOUSTON SYSTEM, Houston, TX (US)

(72) Inventors: Haleh Ardebili, Sugar Land, TX (US); Bahar Moradi-Ghadi, Houston, TX (US)

(73) Assignee: University of Houston System, Houston, TX (US)

( * ) Notice: Subject to any disclaimer, the term of this patent is extended or adjusted under 35 U.S.C. 154(b) by 126 days.

(21) Appl. No.: 16/607,563

(22) PCT Filed: Apr. 24, 2018

(86) PCT No.: PCT/US2018/029096
§ 371 (c)(1),
(2) Date: Oct. 23, 2019

(87) PCT Pub. No.: WO2018/200487
PCT Pub. Date: Nov. 1, 2018

(65) Prior Publication Data
US 2020/0136101 A1    Apr. 30, 2020

Related U.S. Application Data

(60) Provisional application No. 62/490,833, filed on Apr. 27, 2017.

(51) Int. Cl.
*H01M 50/116*     (2021.01)
*H01M 4/66*       (2006.01)
(Continued)

(52) U.S. Cl.
CPC ......... *H01M 50/116* (2021.01); *H01M 4/661* (2013.01); *H01M 4/747* (2013.01); *H01M 10/0565* (2013.01); *H01M 2300/0082* (2013.01)

(58) Field of Classification Search
CPC .... H01M 50/116; H01M 4/661; H01M 4/747; H01M 10/0565; H01M 2300/0082;
(Continued)

(56) References Cited

U.S. PATENT DOCUMENTS 10,361,406 B1 * 7/2019 Wang ................ H01M 10/0525
2015/0280280 A1   10/2015 Ardebili et al.
(Continued)

OTHER PUBLICATIONS

Notification of Transmittal of the International Search Report and the Written Opinion of the International Search Authority—The European Patent Office—dated Jun. 20, 2018 for International Application No. PCT/US2018/029096, 14 pages.
(Continued)

*Primary Examiner* — Stewart A Fraser
(74) *Attorney, Agent, or Firm* — Jackson Walker LLP

(57) ABSTRACT

A flexible and stretchable fabric based electrode-polymer electrolyte battery described herein comprises at least one electrochemical cell. The electrochemical cell comprises a first stretchable electrode having a first active material coupled with a first stretchable fabric current collector, a second stretchable electrode having a second active material coupled with a second stretchable fabric current collector, a stretchable separator configured between the first and second electrodes, and at least one stretchable encapsulant material, wherein the stretchable material encapsulates the electrochemical cell and is capable of reversible bending, twisting, folding and stretching.

16 Claims, 4 Drawing Sheets

(51) Int. Cl.
*H01M 4/74* (2006.01)
*H01M 10/0565* (2010.01)

(58) Field of Classification Search
CPC ......... H01M 10/0436; H01M 10/0525; H01M 10/0585; H01M 4/131
See application file for complete search history.

(56) References Cited

U.S. PATENT DOCUMENTS

2017/0250447 A1* 8/2017 Jiang ................ H01M 10/0585
2018/0145334 A1* 5/2018 Song .................... H01M 4/485

OTHER PUBLICATIONS

Gaikwad, et al., "Highly Stretchable Alkaline Batteries Based on an Embedded Conductive Fabric", Advanced Materials, 2012, 24, pp. 5071-5076.
Keyu Xie, et al., Materials and Structures for Stretchable Energy Storage and Conversion Devices, Advanced Materials, 2014, 26, pp. 3592-3617.
Gaikwad, et al., "Recent Progress on Printed Flexible Batteries: Mechanical Challenges, Printing Technologies, and Future Prospects", Energy Technology Review—2000, 00, pp. 1-25.
Sheng Xu, et al., "Stretchable batteries with self-similar serpentine interconnects and integrated wireless recharging systems", Nature Communications, 2013, pp. 1-8.
Notification of Transmittal of the International Preliminary Report on Patentability dated Nov. 7, 2019 for International Application No. PCT/US2018/029096, 8 pages.

* cited by examiner

200

STRETCHABLE FABRIC BASED ELECTRODE-POLYMER ELECTROLYTE BATTERY

This application claims priority to U.S. Provisional Patent Application No. 62/490,833, entitled "Stretchable Fabric Based Electrode-Polymer Electrolyte Battery," filed Apr. 27, 2017, the entire contents of which are hereby incorporated by reference.

BACKGROUND

This disclosure pertains to batteries, and more specifically to a fabric-based flexible and stretchable battery comprised of rigid or stretchable electrode active material integrated with a stretchable fabric current collector and stretchable polymer electrolyte.

Advancements in the field of electronics have resulted in the need for advancements in the field of batteries. As electronic devices become more flexible, stretchable and mechanically deformable, there is a need for batteries that will have similar properties. Battery technology does not, however, typically allow for large strain deformation.

SUMMARY

The present disclosure relates generally to a battery, and more particularly to a battery based on stretchable fabric-based electrodes.

This disclosure relates to a battery that is based on a single or multiple types of stretchable fabric materials. The stretchable fabric can be used for electrodes where it must be electrically conductive, acting as both a current collector and a stretchable substrate, and contributing to the overall stretchability of the electrode component or battery. The stretchable electrode fabric may be either inherently conductive, made of an electrically conductive material such as a stretchable silver woven fabric, or made of a nonconductive stretchable fabric that is filled with conductive materials (e.g. carbon fillers or metal nanoparticles) that form a conductive and continuous network within the stretchable fabric.

An electrically insulating stretchable fabric can also be used for the electrolyte. If ion conductive, the stretchable fabric can act as the electrolyte and directly facilitate ion transport in the battery. If the stretchable fabric is ion nonconductive, it can serve as a structural component of the stretchable polymer electrolyte and provide mechanical stretchability. The stretchable fabric can be integrated with the polymer electrolyte such as an additive or an interconnected layer.

The stretchable fabric can bend, fold, twist, and stretch. It must be able to undergo small or large tensile or compressive strain and deformation. In addition to stretchability, the fabric-based battery can offer structural compatibility and mechanical properties that are similar to that of a fabric-based application (e.g. smart suits).

Flexible and stretchable lithium ion batteries based on stretchable fabric-based electrodes have a wide range of applications. They can be used in the development of stretchable and wearable energy storage devices for applications such as smart garments, wearable communication, display devices, and medical implants. For example, they can be embedded in textile and fabric, integrated with bendable and stretchable mechanical, electrical or hybrid systems and directly or indirectly interface with human skin, organs or other biological systems.

DETAILED DESCRIPTION OF PREFERRED EMBODIMENTS

The present disclosure relates to flexible and stretchable fabric based batteries.

Preferred embodiments of the present disclosure relate to a stretchable fabric based electrode-polymer electrolyte battery comprising at least one electrochemical cell. The electrochemical cell comprises a first stretchable electrode having a first active material coupled with a first stretchable fabric current collector, a second stretchable electrode having a second active material coupled with a second stretchable fabric current collector, a stretchable polymer electrolyte or separator configured between the first and second electrodes, and at least one stretchable encapsulant material, wherein the stretchable material encapsulates the electrochemical cell and is capable of reversible bending, twisting, folding and stretching.

Figure 1:
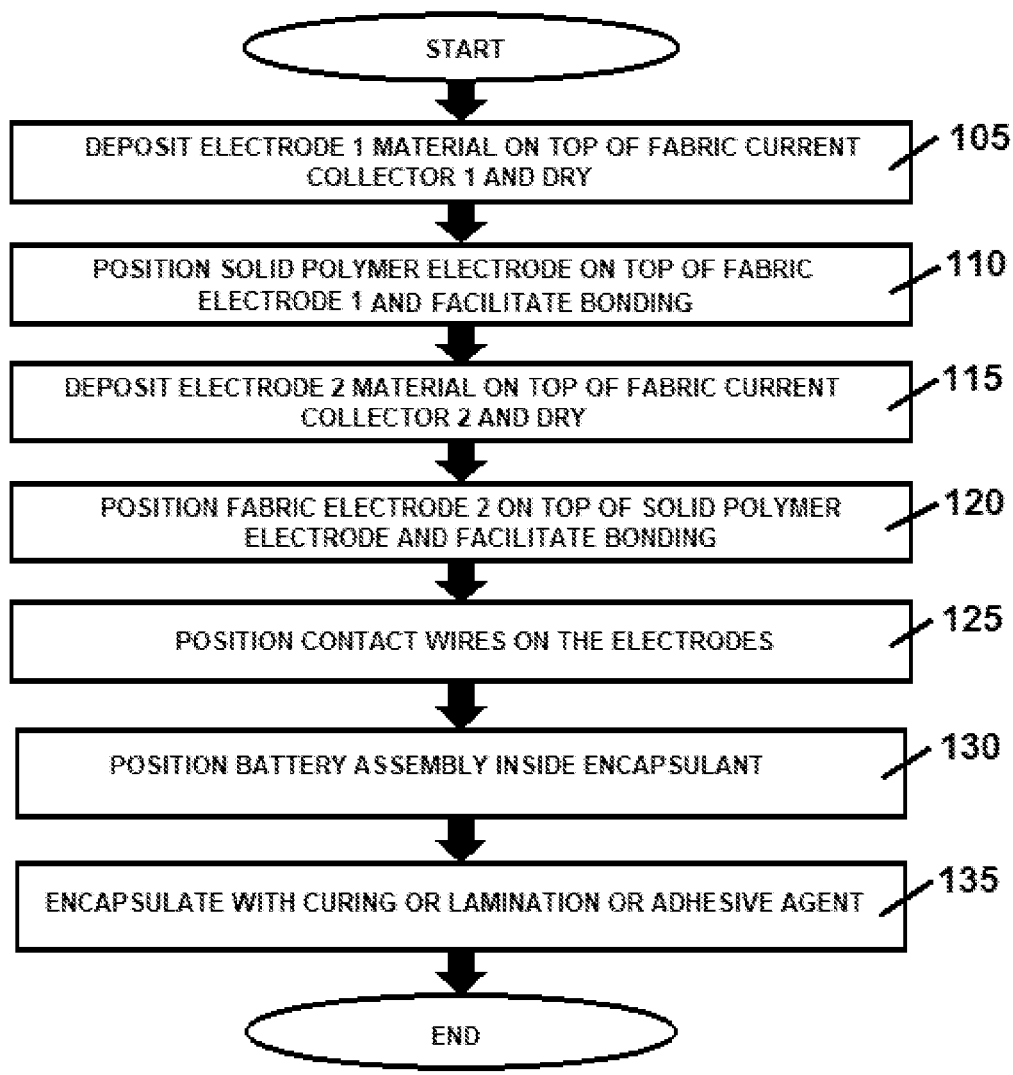
FIG. 1 shows flow chart for an exemplary method of preparing a stretchable battery in accordance with preferred embodiments of this disclosure.

Preferred embodiments of the present disclosure relate to methods for preparing a stretchable fabric based electrode-polymer electrolyte battery. FIG. 1 shows a flow chart for a preferred method of preparing a flexible and stretchable fabric based battery. In this preferred embodiment, a first sheet of electrically conductive stretchable fabric is placed flat. In preferred embodiments, the sheet of electrically conductive stretchable fabric is any suitable stretchable fabric sheet made of metal, such as silver. As shown in FIG. 1, step 105, a measured amount of Electrode 1 Material, or electrode slurry (such as anode or cathode electrode slurry), is then deposited on top of the first fabric sheet, or Fabric Current Collector 1, to form a Fabric Electrode 1. In preferred embodiments, a positive electrode (cathode) slurry material for a lithium ion battery can include electrode active lithium cobalt oxide ($LiCoO_2$), a conductive agent such as carbon black, and a binding polymer such as polyvinylidene fluoride (PVDF). Other types of conventional and non-conventional cathode and anode active materials may be used in the stretchable fabric-based battery. Examples of other potential cathode active materials are $LiFePO_4$, $LiNi_xCo_yAl_zO_2$ group such as $LiNi_{0.8}Co_{0.15}Al_{0.05}O_2$, $LiCo_xNi_yMn_zO_2$ group such as $LiCo_{1/3}Ni_{1/3}Mn_{1/3}O_2$, and $LiMn_2O_4$. Examples of other potential anode active materials are graphite, Si, and $Li_4Ti_5O_{12}$. Although the majority of provided examples are related to lithium ion technology, anode and cathode active materials related to other battery technologies (e.g. sodium ion, magnesium ion, aluminum ion) can also be used in the flexible and stretchable fabric-based battery.

To ensure a proper diffusion of the slurry material into the stretchable fabric, a sufficient amount of time should be allowed to pass before the slurry is dried. The viscosity and density of the slurry can be adjusted according to the porosity of the fabric. For highly porous fabrics, the slurry can be made with a thicker consistency and higher viscosity compared to those of conventional electrodes to control (a) the depth of the diffusion of the slurry material on the structure of the fabric and (b) the thickness of the electrode material on the fabric surface. The thickness of the electrode active material may be further adjusted using a doctor blade or similar tools.

Other preferred methods for the electrode active material slurry deposition or coating of the stretchable fabric may include vertical dipping of the fabric in a slurry paste or spraying of the slurry into the fabric. These alternative methods can include precise thickness control and material uniformity for optimum battery performance.

The stretchable fabric coated with the electrode slurry is subsequently dried, as shown in step 105 in FIG. 1. In preferred embodiments, it can be placed inside a petri dish or other types of oven safe containers, and placed inside the oven at a specified high temperature (e.g. 110 to 120° C.) for a certain amount of time (e.g. 24 to 48 hours) for complete drying. The solid (or gel) polymer electrolyte such as polyethylene oxide with varieties of molecular weights (e.g. 100,000 to 600,000 g/mol) is then integrated with the solid polymer electrode by one of several exemplary methods, including but not limited to:

(1) The polymer paste (preferably viscous and partially dried) may be deposited or poured on top of the stretchable electrode fabric, and then dried.

(2) A dried solid polymer film may be placed on top of the stretchable fabric electrode and pressed (or laminated) such that the interface of electrode and electrolyte is well bonded.

In the preferred embodiment shown in FIG. 1, in step 110, a solid polymer electrode, which may include a polymer paste, is positioned on top of the Fabric Electrode 1 formed in step 105 and bonding is facilitated by drying or pressing.

In preferred embodiments, in step 115 of FIG. 1, a second stretchable fabric electrode (i.e. cathode or anode) or Fabric Electrode 2 is prepared using the same method as stated above. Electrode 2. Material is deposited on top of Fabric Current Collector 2 and allowed to dry. The same type of fabric used for Electrode 1 may be used for Electrode 2. In step 120 of FIG. 1, the second stretchable fabric electrode, Fabric Electrode 2, is then placed on the polymer side of the as-prepared integrated stretchable polymer-fabric electrode, or Fabric Electrode 1, and pressed or otherwise adhered to the polymer such that the interface of the electrode and polymer is well bonded or adhered.

In additional preferred embodiments, in step 125 of FIG. 1, contact wires are positioned on the electrodes. In preferred embodiments, these contact wires are a certain length of a stretchable conductive tape (e.g. stretchable copper) attached on the center of both fabric electrodes from the fabric side and extended long enough to work as the positive and negative terminals of the battery. Other potential conductive tapes include stretchable metal mesh (e.g. aluminum or steel mesh), conductive metal coated on a stretchable material (e.g. rubber, spandex, silicone coated with copper, aluminum, steel, carbon), and wavy flexible conductive material (e.g. wavy shaped copper, aluminum, steel, carbon paper) that can undergo tensile and compressive displacement.

In step 130 of FIG. 1, the integrated stretchable polymer-fabric electrode battery is then encapsulated in a stretchable encapsulant material. In step 135 of FIG. 1, the battery assembly is encapsulated with a curing or lamination or adhesive agent. In preferred embodiments, very high bond "VHB" tape or silicone or other suitable plastic encapsulant materials can be used as a stretchable encapsulant using one of the following exemplary methods:

(1) A viscous paste (either partially cured or solvated) of an appropriate encapsulant material (such as silicone, poly(methyl methacrylate), polyvinylidene fluoride, or polyester) is prepared in a suitable petri dish. The battery is placed on top of the viscous silicone paste, then enough of the viscous silicone paste is poured on top of the battery assembly to cover it. Then, the entire silicon encapsulant gel is completely cured (to change from paste to solid).

(2) Two sheets of solid encapsulant material (such as VHB tape, silicone, poly(methyl methacrylate), polyvinylidene fluoride, polyester or a hybrid (composite) of two or more encapsulant materials) are prepared. The integrated polymer-fabric electrode battery is then placed in between the two sheets, and if necessary, a suitable glue (such as silicone glue) is used to adhere the two sheets of the encapsulant and seal the battery assembly. If VHB tape is used, glue is not required.

Figure 2:
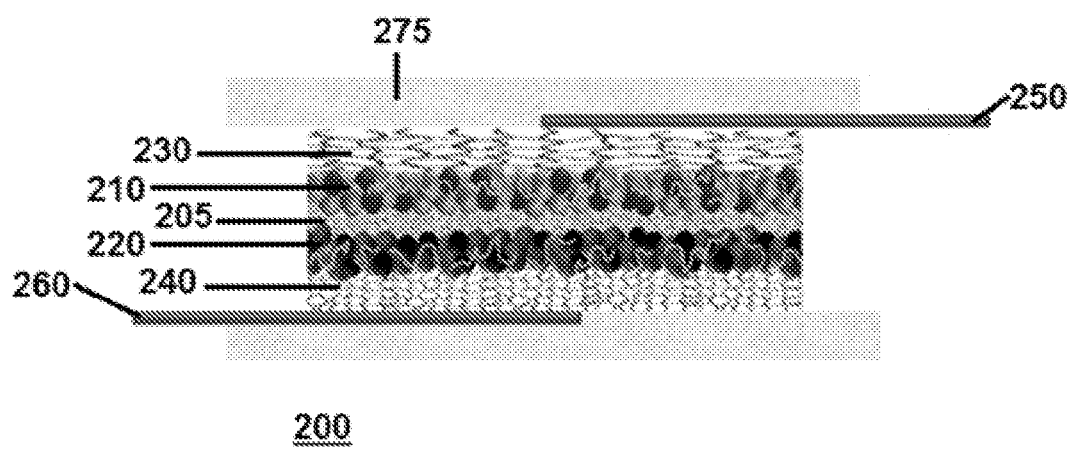
FIG. 2 shows a schematic of a preferred embodiment of a stretchable fabric-based electrode polymer electrolyte battery as described herein.

FIG. 2 shows a schematic of a preferred embodiment of a stretchable fabric-based electrode polymer electrolyte battery 200 including at least one electrochemical cell made up of exemplary components. In the embodiment shown in FIG. 2, the central stretchable separator material 205 may be a solid polymer electrolyte. Any electrically insulating stretchable fabric can be used for the stretchable separator material 205. If the material is ion conductive, the stretchable separator material can act as the electrolyte and directly facilitate ion transport in the battery. If the stretchable separator material is ion nonconductive, it can serve as a structural component of the stretchable polymer electrolyte and provide mechanical stretchability. The stretchable separator material can be integrated with a polymer electrolyte such as an additive or an interconnected layer.

As shown in FIG. 2, on either side of the stretchable separator material 205 are the electrode layers, a first electrode material 210 that may be designated as electrode 1 layer and a second electrode material 220 that may be designated as electrode 2 layer. Adjacent to the electrode layers are a first stretchable fabric current collector layer 230 that may be designated as fabric current collector 1 and a second stretchable fabric current collector layer 240 that may be designated as fabric current collector 2. The stretchable fabric current collector layers have an inner surface and an outer surface. Each set of electrode material 210, 220 and stretchable fabric current collector layers 230, 240 is coupled together, such that the electrode material is attached to the inner surface of the stretchable fabric current collector layer to form an active electrode surface. The first electrode material 210 coupled to the first stretchable fabric current collector layer 230 make up a first stretchable electrode, while the second electrode material 220 coupled to the second stretchable fabric current collector layer 240 make up a second stretchable electrode. The active electrode surfaces of the first and second stretchable electrode contact the stretchable separator material 205, which separates the active electrode surfaces made up of first electrode material 210 and second electrode material 220. The first stretchable fabric current collector layer 230 and second stretchable fabric current collector layer 240 form outer layers of the combined first stretchable electrode and second stretchable electrode, as they are coupled together. In preferred embodiments, the stretchable fabric current collector layers are any suitable stretchable fabric sheet made of metal, such as silver.

The stretchable fabric current collector layers may be inherently electrically conductive, such as a stretchable silver woven fabric, or nonconductive stretchable fabric that is filled with conductive materials (such as carbon fillers or any suitable conductive fillers) that form a conductive and continuous network within the stretchable fabric. The electrode material can be any suitable electrode material, including any conventional and non-conventional cathode and anode active materials. In preferred embodiments, a positive electrode (cathode) slurry material for a lithium ion battery can include electrode active lithium cobalt oxide ($LiCoO_2$), a conductive agent such as carbon black, and a binding polymer such as polyvinylidene fluoride (PVDF). In preferred embodiments, a negative electrode (anode) slurry material can include electrode active graphite, a conductive agent such as carbon black, and a binding polymer such as polyvinylidene fluoride (PVDF).

Also shown in FIG. 2, attached to the outer surfaces of the fabric current collector layers are a first electrode terminal 250 that may be designated as electrode 1 terminal and a second electrode terminal 260 that may be designated as electrode 2 terminal. The electrode terminals 250, 260 can be any suitable form, including stretchable contact wires or stretchable conductive tape, such as stretchable copper tape, or stretchable metal mesh, conductive metal coated on a stretchable material, or wavy flexible conductive material. Surrounding at least a portion of the first stretchable electrode, including at least a portion of first electrode terminal 250, and the second stretchable electrode, including at least a portion of second electrode terminal 260, is encapsulation material 275. Encapsulation material 275 can be any suitable stretchable encapsulant material such as a curing or lamination or adhesive agent, or combinations thereof. In preferred embodiments, very high bond "VHB" tape or silicone or other suitable solid encapsulant materials, including hybrids or composites of two or more encapsulant materials, are used as encapsulant material 275. In additional preferred embodiments, a suitable glue such as silicone glue is used to adhere the encapsulant material 275 to the stretchable electrodes. Portions of first electrode terminal 250 and second electrode terminal 260 extend out of the encapsulant material 275.

Figure 3A:
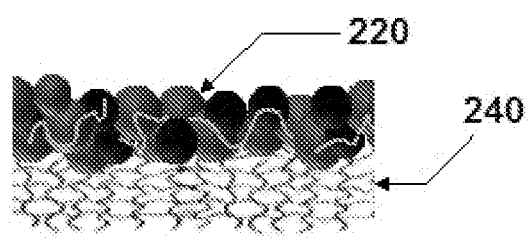
FIG. 3A shows portions of preferred embodiments of a stretchable battery including a fabric current collector layer with an electrode layer on top.
Figure 3B:
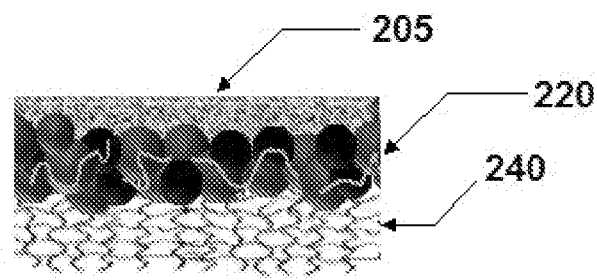
FIG. 3B shows portions of preferred embodiments of a stretchable battery including a fabric current collector layer with an electrode layer and a solid polymer electrolyte on top.

FIGS. 3A and 3B show closer views of portions of a preferred embodiment of stretchable battery 200. FIG. 3A shows fabric current collector 2 layer 240 with electrode 2 layer 220 deposited on top. FIG. 3B shows fabric current collector 2 layer 240 with electrode 2 layer 220 deposited on top and solid polymer electrolyte 205 on top of that.

Figure 4A:
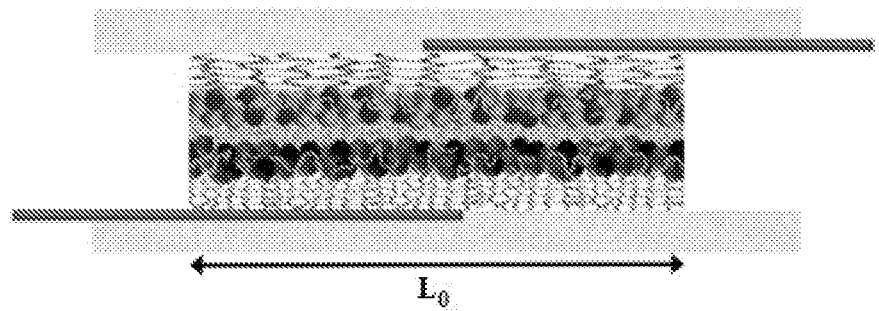
FIG. 4A shows preferred embodiments of a stretchable battery in a flat position.
Figure 4B:
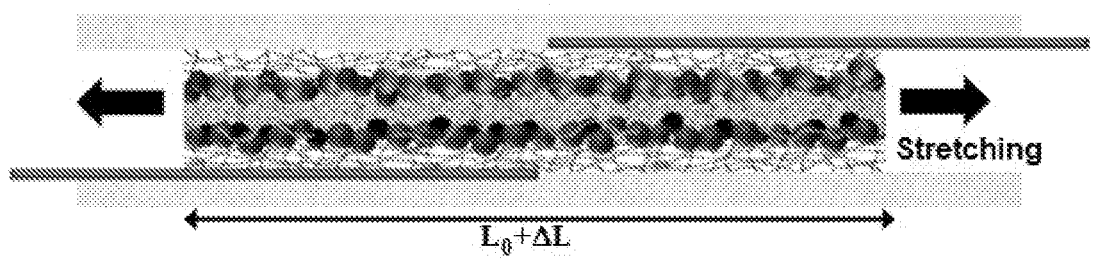
FIG. 4B shows preferred embodiments of a stretchable battery in a stretched position.

FIGS. 4A and 4B show additional views of a preferred embodiment of stretchable battery 200 having, in FIG. 4A, length $L_0$ in a flat position. In FIG. 4B, stretchable battery 200 is in a stretched position and has length $L_0+\Delta L$.

Figure 5:
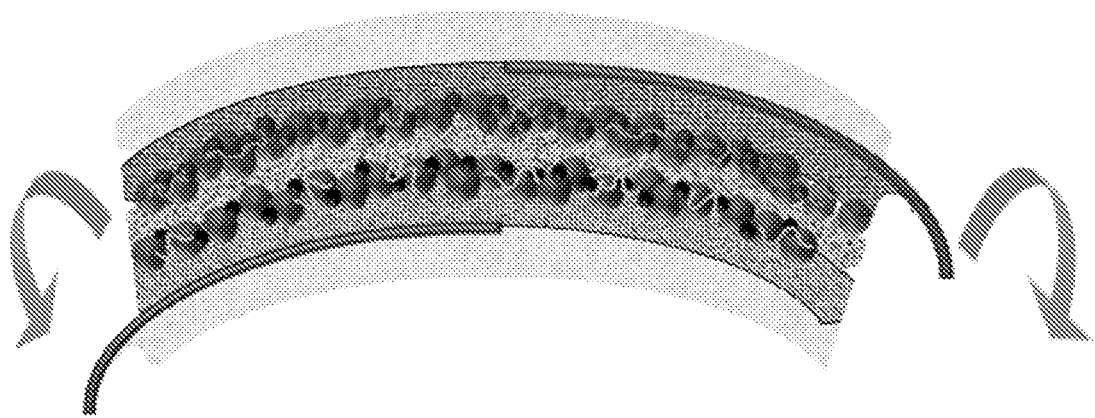
FIG. 5 shows a preferred embodiment of a stretchable battery in a bent position.

FIG. 5 shows an additional view of a preferred embodiment of stretchable battery 200 in a bent position.

Figure 6A:
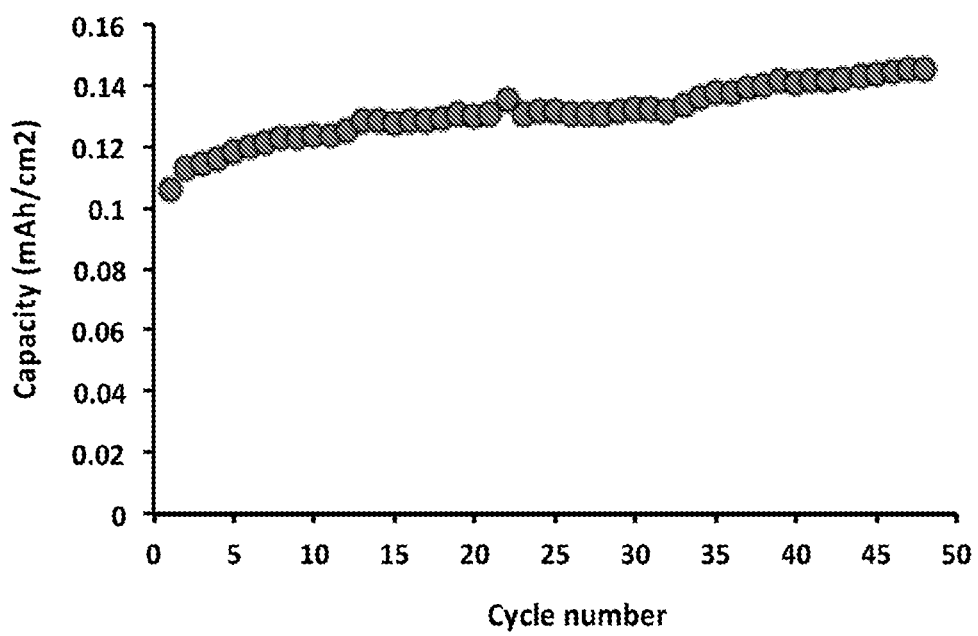
FIG. 6A shows capacity performance over a number of cycles for a stretchable battery in accordance with preferred embodiments of the present disclosure.
Figure 6B:
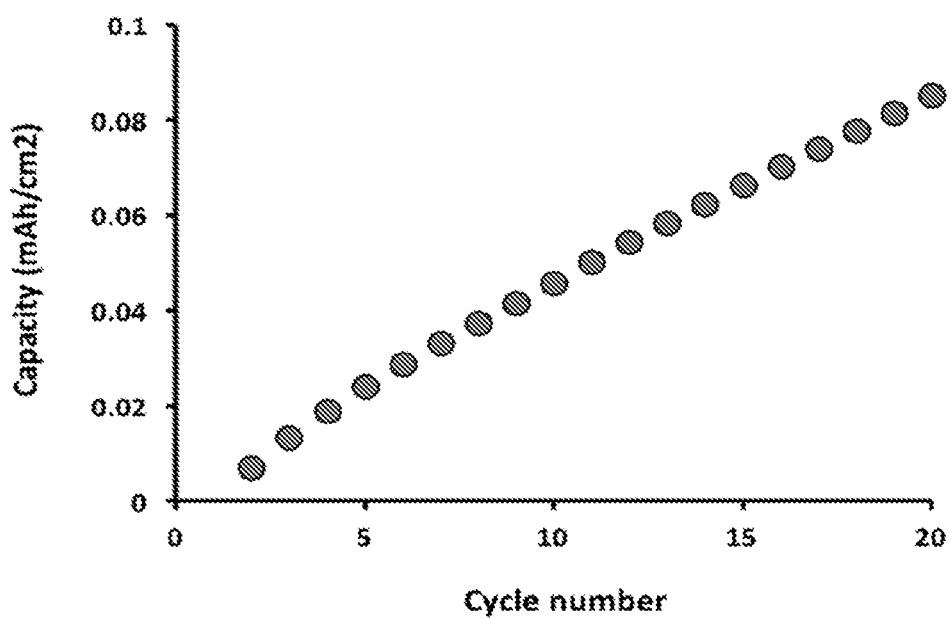
FIG. 6B shows capacity performance over a number of cycles for a stretchable battery in accordance with preferred embodiments of the present disclosure.

As shown in FIG. 6A, the capacity performance of an embodiment of a stretchable fabric-based electrode-polymer electrolyte battery was tested over a number of cycles. The tested prototype consisted of a cathode based on silver fabric current collector with $LiCoO_2$ as the active materials, a solid polymer electrolyte based on 100,000 MW poly(ethylene oxide) and graphene oxide nanoparticles, and an anode based on a conventional copper foil current collector with graphite as the active material. The battery components were assembled in a coin cell structure and the performance of the battery was tested by applying a constant current. In addition to coin cell assembly, preliminary testing of an embodiment of a stretchable fabric-based electrode-polymer electrolyte battery in transparent, stretchable VHB encapsulation was also conducted, as shown in FIG. 6B. The tested prototype consisted of a cathode based on a silver fabric current collector with $LiCoO_2$ as the active materials, a solid polymer electrolyte based on 600,000 MW poly(ethylene oxide), and an anode based on based on silver fabric current collector with graphite as the active materials. The entire structure of such assembly is flexible and stretchable due to the flexibility and stretchability of each and all the battery components including cathode, anode, electrolyte, and encapsulation.

What is claimed is:

1. A stretchable battery, comprising:
   at least one electrochemical cell, wherein the electrochemical cell comprises:
   a first stretchable electrode, wherein the first stretchable electrode comprises a first stretchable fabric current collector layer having an inner surface and an upper surface, a first electrode material coupled to the inner surface of the first stretchable fabric current collector layer to form a first active electrode surface on the inner surface of the first stretchable fabric current collector layer, and a first electrode terminal connected to the upper surface of the first stretchable fabric current collector layer;
   a second stretchable electrode, wherein the second stretchable electrode comprises a second stretchable fabric current collector layer having an inner surface and an upper surface, a second electrode material coupled to the inner surface of the second stretchable fabric current collector layer to form a second active electrode surface on the inner surface of the second stretchable fabric current collector layer, and a second electrode terminal connected to the upper surface of the first stretchable fabric current collector layer;
   a stretchable separator material coupled to the first active electrode surface and the second active electrode surface, wherein the first active electrode surface and the second active electrode surface are separated by the stretchable separator material, wherein the first stretchable electrode and the second stretchable electrode form an electrode assembly, and wherein the upper surfaces of the first stretchable fabric current collector layer and the second stretchable fabric current collector layer form outer layers of the electrode assembly; and
   an encapsulant material surrounding at least a portion of the electrode assembly, wherein a portion of the first electrode terminal and a portion of the second electrode terminal extend out of the encapsulant material.

2. The stretchable battery of claim 1, wherein at least one of the first stretchable fabric current collector layer or the second stretchable fabric current collector layer is comprised of inherently electrically conductive material.

3. The stretchable battery of claim 2, wherein the inherently electrically conductive material is a stretchable silver woven fabric.

4. The stretchable battery of claim 1, wherein at least one of the first stretchable fabric current collector layer or the second stretchable fabric current collector layer is comprised of nonconductive stretchable fabric further comprising conductive filler materials that form a network within the nonconductive stretchable fabric.

5. The stretchable battery of claim 4, wherein the conductive filler materials are carbon fillers.

6. The stretchable battery of claim 1, wherein the first electrode material comprises cathode active materials and the second electrode material comprises anode active materials.

7. The stretchable battery of claim 1, wherein the stretchable separator material is electrically insulating stretchable fabric.

8. The stretchable battery of claim 1, wherein the stretchable separator material is ion conductive electrolyte material.

9. The stretchable battery of claim 1, wherein the stretchable separator material is a solid polymer electrolyte.

10. The stretchable battery of claim 1, wherein the stretchable separator material is ion nonconductive material integrated with an electrolyte material.

11. The stretchable battery of claim 1, wherein the encapsulant material is a curing agent, lamination agent, adhesive agent, or combinations thereof.

12. The stretchable battery of claim 11, wherein the encapsulant material is viscous silicone paste.

13. The stretchable battery of claim 1, wherein the encapsulant material is a solid encapsulant material.

14. The stretchable battery of claim 13, wherein the solid encapsulant material is very high bond tape or silicone.

15. A method for preparing a stretchable battery, comprising:
(a) coupling a first electrode material to an inner surface of a first stretchable fabric current collector layer to form a first active electrode surface on the inner surface of the first stretchable fabric current collector layer;
(b) connecting a first electrode terminal to an upper surface of the first stretchable fabric current collector layer, wherein the first electrode material, the first stretchable fabric current collector layer, and the first electrode terminal make up a first stretchable electrode;
(c) coupling a second electrode material to an inner surface of a second stretchable fabric current collector layer to form a second active electrode surface on the inner surface of the second stretchable fabric current collector layer;
(d) connecting a second electrode terminal to an upper surface of the second stretchable fabric current collector layer, wherein the second electrode material, the second stretchable fabric current collector layer, and the second electrode terminal make up a second stretchable electrode;
(e) coupling a stretchable separator material to the first active electrode surface and the second active electrode surface, whereby the first active electrode surface and the second active electrode surface are separated by the stretchable separator material, and wherein the first stretchable electrode and the second stretchable electrode form an electrode assembly;
(f) surrounding at least a portion of the electrode assembly with an encapsulant material to form a first electrochemical cell making up a stretchable battery, wherein a portion of the first electrode terminal and a portion of the second electrode terminal extend out of the encapsulant material.

16. The method of claim 15, further comprising repeating steps (a)-(f) to form one or more additional electrochemical cells making up the stretchable battery.

\* \* \* \* \*

UNITED STATES PATENT AND TRADEMARK OFFICE
CERTIFICATE OF CORRECTION

| | | |
|---|---|---|
| PATENT NO. | : 11,108,106 B2 | Page 1 of 1 |
| APPLICATION NO. | : 16/607563 | |
| DATED | : August 31, 2021 | |
| INVENTOR(S) | : Haleh Ardebili et al. | |

It is certified that error appears in the above-identified patent and that said Letters Patent is hereby corrected as shown below:

In the Specification

In Column 1, Line 10 insert -- "This invention was made with government support under CAREER Award No. CMMI-1254477 (G105611) awarded by the National Science Foundation. The government has certain rights in the invention." --, therefor.

Signed and Sealed this
Second Day of April, 2024

Katherine Kelly Vidal
*Director of the United States Patent and Trademark Office*